SYNCHRONOUS TELEGRAPH SYSTEM
Filed Jan. 3, 1947 2 Sheets-Sheet 1
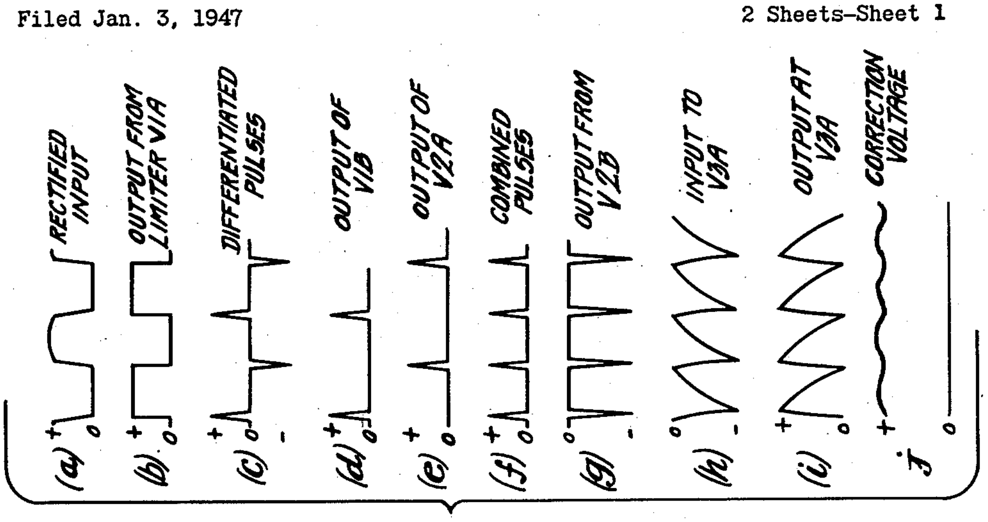
Fig. 3.
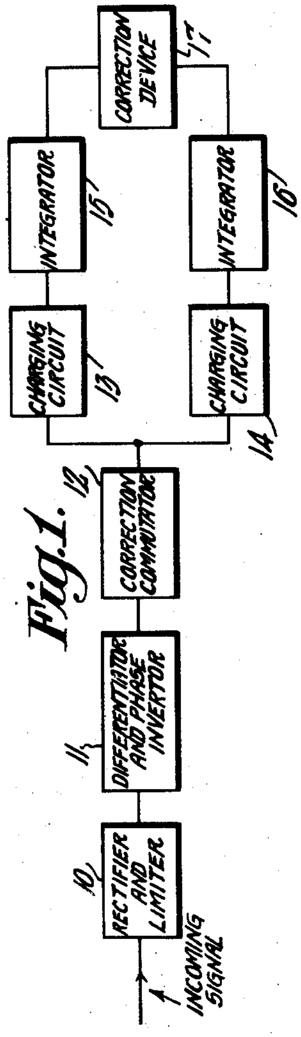
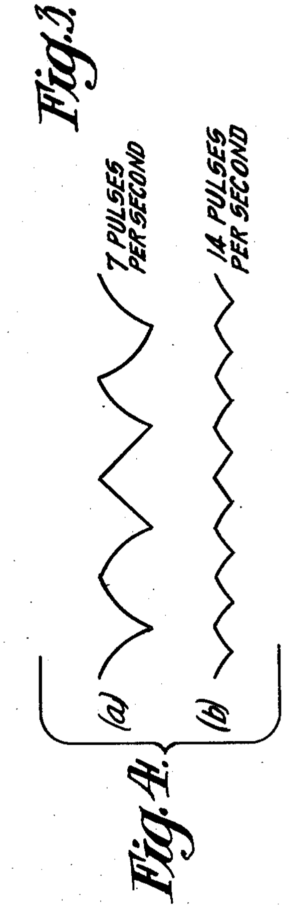
Fig. 4.
INVENTORS
LEWIS A. THOMAS
& ARTHUR E. CANFORA
BY H. S. Grover
ATTORNEY Dec. 19, 1950 A. E. CANFORA ET AL 2,534,337

SYNCHRONOUS TELEGRAPH SYSTEM

Filed Jan. 3, 1947 2 Sheets-Sheet 2

INVENTORS
LEWIS A. THOMAS
& ARTHUR E. CANFORA
BY H. S. Grover
ATTORNEY

UNITED STATES PATENT OFFICE 2,534,337

SYNCHRONOUS TELEGRAPH SYSTEM

Arthur E. Canfora and Lewis A. Thomas, Brooklyn, N. Y., assignors to Radio Corporation of America, a corporation of Delaware Application January 3, 1947, Serial No. 720,018

15 Claims. (Cl. 178—69.5)

This invention relates to synchronous telegraph systems and more particularly to a correction unit for a mechanical synchronous system such as a time division multiplex system.

In the transmission of intelligence by facsimile and multiplex telegraph systems operating on the time division principle it becomes necessary to maintain quite close synchronism between the transmitting and receiving stations. It has been the usual practice to provide local standard speed or frequency controls at each station and to correct the phase and synchronism at the receiver in accordance with either the transmitted intelligence bearing signal elements or else by means of a special correction signal transmitted periodically at short intervals.

The use of a special signal for this purpose is undesirable since it results in a diminution of the time available for the intelligence bearing signals and so reduces the speed of the system to that extent. As for deriving the correction or phasing indications from the transmitting signal elements themselves, experience has shown that it is impossible to transmit telegraph signals without some form of distortion, which distortion causes either over or under correction.

Alternatively, systems have been devised utilizing correction pulses produced locally by the signal transitions. In systems of this type with which applicant is acquainted, all correction pulses are limited so that the final effect of the pulses is the same and the total correction force varies with the number of correction pulses occurring. It has been found that during idle periods of operation, when signal transitions are few, the total correction force is too small to keep the receiving equipment in phase and loss of synchronism results.

It is a purpose of this invention to provide a correction unit which will correct the weakness in previous systems utilizing correction pulses produced by the signal transitions, by producing an essentially constant current applied to the correction relay when transitions occur at any rate from say seven to seventy per second.

Briefly, in accordance with the invention, pulses are produced by amplifying and limiting a received rectified signal and differentiating the transitions. After determination of phasing in a correction commutator, the pulses are applied to a charging circuit which is affected by the pulses in roughly inverse proportion to their frequency and direct proportion to their height. These widened pulses amplified are applied to the grid of a power tube, integrated, and the output of the tube applied to the correction relay.

The above and other objects and advantages of this invention will become apparent upon a consideration of the following detailed description taken in conjunction with the accompanying drawings, in which:

Fig. 1 represents, in block diagram, the basic elements of the invention.

Fig. 3 represents a series of curves corresponding to the correction voltages as they appear at various points in the circuit shown in Fig. 2 and Fig. 4 represents the charging characteristics of an element of the invention as the frequency of signal transitions varies.

Figure 2:
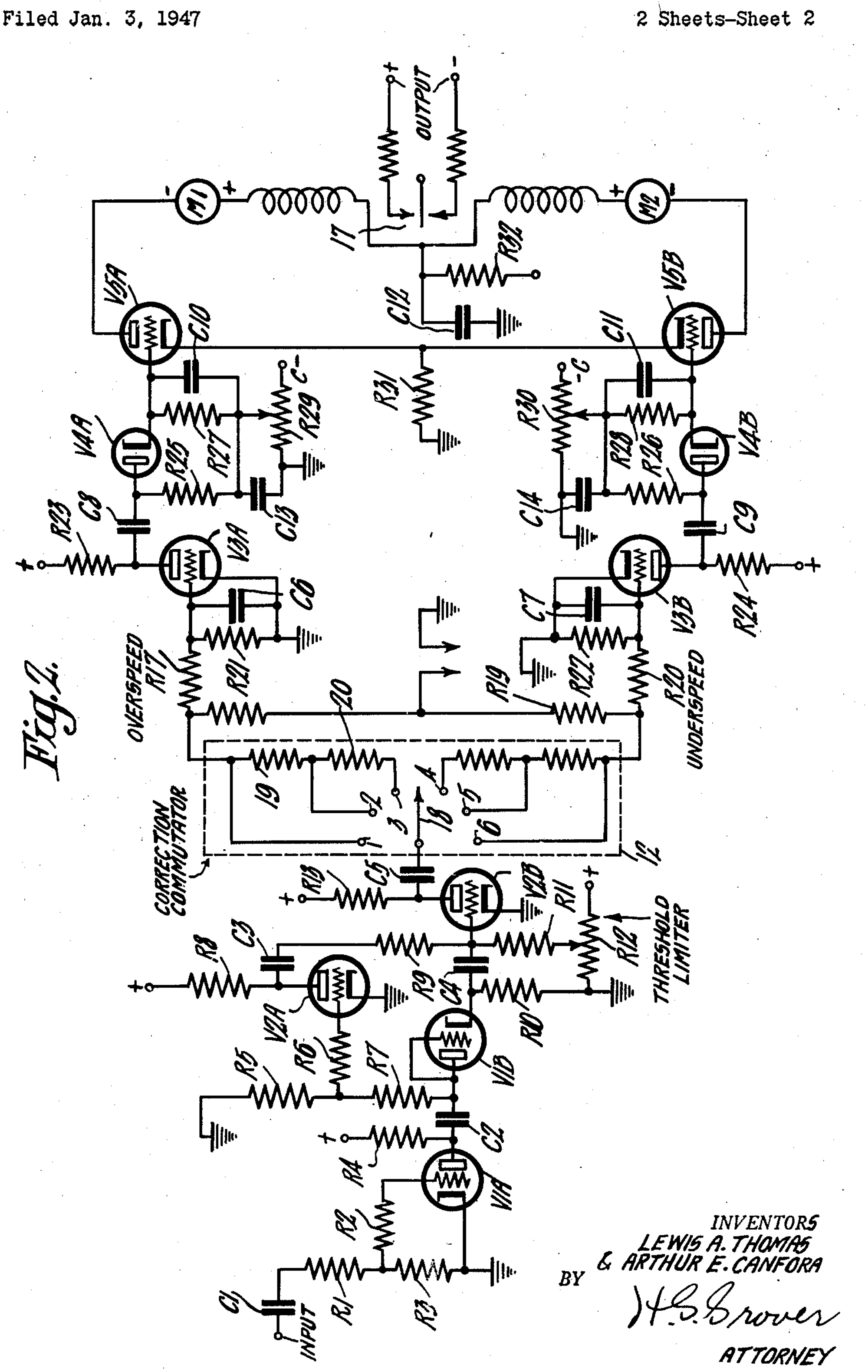
Fig. 2 represents schematically a preferred circuit for accomplishing the purposes of the invention.

The curves of Figs. 3 and 4 are all drawn to the same horizontal time scale in order to show the correlation of essential operations in response to signals.

Referring to Fig. 1, it will be seen that the incoming signal is first supplied to a rectifier and limiter 10, then passes to a differentiator and phase inverter 11, and thence to a correction commutator 12. The commutator is arranged, as will appear, to supply the pulses produced by the incoming signals to either the overspeed correction circuit or the underspeed correction circuit. These circuits are identical and each consists of a charging circuit, 13 and 14, respectively, and an integrator, 15 and 16, respectively. These correction circuits supply correction voltages to a correction device 17 which is arranged to apply the correction voltage so as to bring the received message toward the "in phase" condition.

The method of producing the correction pulses from the incoming signals may best be understood from a consideration of Figs. 2 and 3. The signals as they are received are rectified according to standard practice. The rectified signals as they appear on the input to the correction device will have substantially the form shown on curve *a* of Fig. 3. The signals are fed through a suitable coupling network to the grid of vacuum tube V1A. This tube acts as a limiter stage whose function is further to square up the signal. The output from the limiter stage is represented in curve *b* of Fig. 3. In order to differentiate the transitions between mark and space elements of the received code the output from the limiter tube V1A is supplied to capacitor C2 and resistor R7. As will be understood, the alternate charging of condenser C2 at the start of a mark signal and its discharge through resistor R7 at the end of the mark signal will produce on the grids of tube V1B and V2A alternate plus and minus pulses corresponding thereto. The different pulses will take the form shown in curve *c* of Fig. 3.

The positive pulses thus produced are fed to the diode-connected tube V1B and passed thereby, as indicated in curve *d* of Fig. 3. The negative pulses are supplied to the grid of tube V2A where they are inverted, as shown in curve *e* of Fig. 3. Both sets of pulses, which now appear as positive pulses as shown in curve *f* of Fig. 3, are supplied to the grid of vacuum tube V2B. The grid bias of vacuum tube V2B is adjusted by means of potentiometer R12 so that only the narrow tops of the pulses will be passed. The pulses appear in the output of tube V2B in inverted form as negative pulses and, due to the limiting action of the tube, will have a uniform duration in order of say 300 micro-seconds, as indicated in curve *g* of Fig. 3. The commutator 12 is driven in synchronism with the receiving apparatus. The negative pulses appearing in the output of tube V2B will be fed to the commutator by means of the rotating shorting bar 18.

Let us assume that a signal is being received and that the receiving machine is "in phase" with this received signal. In this condition with 50-50 signals, the transition pulses occur while the shorting bar 18 on the correction commutator 12 is between brushes 3 and 4 of the commutator. When this occurs, no pulses pass to either the overspeed correction chain or the underspeed correction chain. When the received signals are not 50-50 the transition pulses will appear symmetrically on either side of the brushes 3 and 4 or, in other words, on symmetrical steps of the commutator. In this case, equal pulses will be passed to each chain and equal and opposite pulses will be supplied to the correction relay 17 whose armature thus remains in the neutral position.

When the receiving machine gets out of phase in either direction, the direction of correction is adjusted so as to bring the system back to the "in phase" condition.

It will be noted that the overspeed chain and the underspeed chain are identical. Therefore, the operation and construction of only one chain will be described.

The correction pulses supplied to the brush 1 of the commutator pass directly to the overspeed correction chain. The correction pulses which are supplied to brush 2 of the commutator are supplied to the correction chain through resistor 19 while the correction pulses supplied to brush 3 of the commutator pass through resistors 19 and 20 before reaching the overspeed correction chain. The correction pulses are applied through line resistor R17 to the grid of tube V3A. Connected in parallel with the cathode and grid of the tube V3A, there is provided resistor 21 and condenser C6. Condenser C6 is chosen to have a value such that one pulse will cause it to attain only a small percentage of the pulse voltage. The resistor R21 is chosen so as to have a value such that condenser C6 is effectively discharged when the pulses occur only during idling time, such as would be produced by a diplex signal. Accordingly, during idling time the input to tube V3A will assume the form shown in curve *h* of Fig. 3. These pulses appear inverted on the plate of tube V3A. These variable amplitude saw-tooth waves are passed through condenser C9, which removes the direct current component, to the diode V4A. The diode V4A passes these pulses and allows them to charge condenser C10 positively but prevents its discharge except through resistor R27, integrating the applied energy. Thus an average value of positive voltage is applied to the grid of tube V5A. The amplitude of the voltage applied to the grid of tube V5A will be substantially constant during such time as the pulses are applied to the commutator on any particular brush.

In describing the operation of the invention, it will be assumed that the receiving machine has been allowed to go out of phase to its extreme point, that is, until the pulses occur when the shorting bar 18 is on brush 1. With the pulses occurring on brush 1, a pulse from the commutator tends to charge condenser C6 negatively through resistor R17. However, it can charge only for the duration of the pulse so that the condenser will attain only a small percentage of the pulse voltage. At the end of the pulse the condenser C6 starts to discharge through resistor R21 until the advent of the next pulse. If these occur no oftener than, let us say, 7 per second, such as during the idle time, the condenser C6 will be effectively discharged and ready to start another charge—discharge cycle. The charge and discharge of the condenser C6 under these conditions is illustrated by the curve *a* of Fig. 4.

As the pulses occur more often, condenser C6 will not completely discharge between pulses but as the next succeeding pulse comes in will again begin to discharge. However, the next charge will be along a portion of the charging curve which is not as steep as it was during the former pulse so that the voltage increment on condenser C6 will be smaller than before roughly proportioned to the time interval since the preceding pulse. Curve *b* of Fig. 4 is illustrative of the charging rate of the condenser C6 when the number of pulses is double that shown in curve *a* of Fig. 4.

As explained above, the output of the tube V3A will have a form substantially as shown in curve *i* of Fig. 3. The integration of the pulses which pass tube V4A and charge condenser C10 results in a steady applied voltage on the grid of tube V5A as shown in Curve *j* of Fig. 3. The voltage applied to the grid of tube V5A will be of essentially constant value at all times while pulses are being supplied to the brush 1 of the commutator. This applies an essentially constant correction force, in the proper direction, to the correction relay and operates the correction motor to bring the receiving machine toward the "in phase" condition.

The shorting bar 18 is designed so that it will touch the brush 2 before it leaves brush 1 and will make contact with brush 3 before it leaves brush 2. As it leaves brush 1 making contact with only brush 2, an additional resistor 19 is inserted in series with resistor R17 and the amplitude of the pulse supplied to condenser C6 will be correspondingly smaller. This charges condenser C6 to a lesser extent since the percentage of charge is constant for two pulses of different amplitude but of the same width. This produces a smaller plate current in tube V5A and a smaller force on the relay. Similarly, with the shorting bar 18 on brush 3 of the commutator, the force will be still further reduced due to the inclusion of resistor 20 in the series circuit to resistor R17. However, the force will still be sufficient to operate the relay and hence the correction motor.

In order to insure the proper adjustment of the apparatus potentiometers R29 and R30 are included in the discharge circuit of condensers C10 and C11. These potentiometers are adjusted so that the meters M1 and M2 in the output circuits of tubes V5A and V5B, respectively, give equal readings for equal degrees of asynchronism.

Various modifications will suggest themselves to those skilled in the art. Thus a differentiation of the transitions may be produced by supplying the rectified incoming signal to a transformer rather than the condenser resistor network shown. Similarly, although triode tubes have been shown, multipurpose tubes could well be used. Accordingly, it is to be understood that the invention is not to be limited to the particular circuits and apparatus described.

In Fig. 2 certain line resistors, biasing resistors and by-pass condensers have been shown together with terminals indicative of a source of tube operating potentials. These elements have not been specifically referred to since their use and operation are believed apparent from an inspection of the diagram.

Having described our invention, what we claim is:

1. An arrangement for synchronizing the operation of telegraph apparatus with received code signals, including means to produce unidirectional current pulses of substantially constant amplitude, one of said pulses being produced for each transition between marking and spacing elements of said code signals, means to vary the amplitude of said pulses in accordance with the degree of asynchronism between said code signals and said telegraph apparatus to produce correction pulses, a charging circuit, means to apply said correction pulses to said charging circuit to affect the same in direct proportion to the amplitude of said correction pulses and independently of the repetition rate thereof, means to integrate the output of said charging circuit, and means to utilize said integrated output to control said telegraph apparatus.

2. An arrangement for synchronizing the operation of telegraph apparatus with received code signals, said arrangement including means to produce unidirectional current pulses of substantially constant amplitude, one of said pulses being produced for each transition between marking and spacing elements of said code signals, means to vary the amplitude of said pulses in accordance with the degree of synchronism between said code signals and said telegraph apparatus to produce correction pulses, an overspeed charging circuit, an underspeed charging circuit, means to apply said correction pulses to said charging circuits to affect the same in direct proportion to the amplitude of said correction pulses and independently of the repetition rate thereof, means to integrate the output of said charging circuits, and means to utilize said integrated output to control said telegraph apparatus.

3. An arrangement for synchronizing the operation of telegraph apparatus with received code signals including both message and idle time signals, said arrangement including a correction device, means to produce unidirectional current pulses of substantially constant amplitude, one of said pulses being produced for each transition between marking and spacing elements of said code signals, a commutator synchronized with said correction device means to vary the amplitude of said pulses in accordance with the degree of synchronism between said code signals and said commutator to produce correction pulses, a charging circuit, means to apply said correction pulses to said charging circuit to affect the same in direct proportion to the amplitude of said correction pulses and independently of the repetition rate thereof, means to integrate the output of said charging circuit, and means to utilize said integrated output to control said correction device.

4. An arrangement for synchronizing the operation of telegraph apparatus with received code signals, said arrangement including a correction device, means to produce unidirectional current pulses of substantially constant amplitude, one of said pulses being produced for each transition between marking and spacing elements of said code signals, a commutator synchronized with said correction device, means to vary the amplitude of said pulses in accordance with the degree of asynchronism between said code signals and said commutator to produce correction pulses, an overspeed charging circuit, an underspeed charging circuit, means to apply said correction pulses to said charging circuits to affect the same in direct proportion to the amplitude of said correction pulses and independently of the repetition rate thereof, means to integrate the output of said charging circuits, and means to utilize said integrated output to control said correction device.

5. An arrangement for synchronizing the operation of telegraph apparatus with received code signals including both message and idle time signals, said arrangement including means to produce unidirectional current pulses of substantially constant amplitude, one of said pulses being produced for each transition between marking and spacing elements of said code signals, an overspeed charging circuit, an underspeed charging circuit, a commutator connected in circuit between said charging circuits and said pulse producing means to vary the amplitude of said pulses in accordance with the degree of asynchronism between said code signals and said commutator to produce correction pulses, said commutator being arranged to apply said correction pulses to said overspeed charging circuit when said commutator is being driven at a speed higher than the production of said received code signals and to apply said correction pulses to said underspeed charging circuits when said commutator is being driven at a speed lower than the production of said received code signals, said charging circuits being affected in proportion to the amplitude of said correction pulses and independently of the repetition rate thereof, means to integrate the output of said charging circuits, and means to utilize said integrated output to control said telegraph apparatus.

6. An arrangement for synchronizing the operation of telegraph apparatus with received code signals including both message and idle time signals, said arrangement including a correction device, means to produce unidirectional current pulses of substantially constant amplitude, one of said pulses being produced for each transition between marking and spacing elements of said code signals, an overspeed charging circuit, an underspeed charging circuit, a commutator synchronized with said correction device and connected in circuit between said charging circuits and said pulse producing means to vary the amplitude of said pulses in accordance with the degree of asynchronism between said code signals and said commutator to produce correction pulses, said commutator being arranged to apply said correction pulses to said overspeed charging circuit when said commutator is being driven at a speed higher than the production of said received code signals and to apply said correction pulses to said underspeed charging circuits when said commutator is being driven at a speed lower than the production of said received code signals, said charging circuits being affected in proportion to the amplitude of said correction pulses and independently of the repetition rate thereof, means to integrate the output of said charging circuits, and means to utilize said integrated output to control said correction device.

7. An arrangement for synchronizing the operation of telegraph apparatus with received code signals including both message and idle time signals, said arrangement including means to produce unidirectional current pulses of substantially constant amplitude, one of said pulses being produced for each transition between marking and spacing elements of said code signals, an overspeed charging circuit, an underspeed charging circuit, a commutator connected in circuit between said charging circuits and said pulse producing means to vary the amplitude of said pulses in accordance with the degree of asynchronism between said code signals and said commutator to produce correction pulses, said commutator being arranged to apply said correction pulses to said overspeed charging circuit when said commutator is being driven at a speed higher than the production of said received code signals and to apply said correction pulses to said underspeed charging circuits when said commutator is being driven at a speed lower than the production of said received code signals, each of said charging circuits including a condenser having a capacity value at which a single one of said pulses will only partially charge the same and a parallel impedance device through which said condenser is discharged whereby said charging circuits are affected in proportion to the amplitude of said correction pulses and independently of the repetition rate thereof, means to integrate the output of said charging circuits, and means to utilize said integrated output to control said telegraph apparatus.

8. An arrangement for synchronizing the operation of telegraph apparatus with received code signals including both message and idle time signals, said arrangement including a correction device, means to produce unidirectional current pulses of substantially constant amplitude, one of said pulses being produced for each transition between marking and spacing elements of said code signals, an overspeed charging circuit, an underspeed charging circuit, a commutator synchronized with said correction device and connected in circuit between said charging circuits and said pulse producing means to vary the amplitude of said pulses in accordance with the degree of asynchronism between said code signals and said commutator to produce correction pulses, said commutator being arranged to apply said correction pulses to said overspeed charging circuit when said commutator is being driven at a speed higher than the production of said received code signals and to apply said correction pulses to said underspeed charging circuits when said commutator is being driven at a speed lower than the production of said received code signals, each of said charging circuits including a parallel connected impedance element and condenser of capacity value at which a single one of said pulses will only partially charge said condenser whereby said charging circuits are affected in proportion to the amplitude of said correction pulses and independently of the repetition rate thereof, means to integrate the output of said condenser impedance device circuits, and means to utilize said integrated output to control said correction device.

9. An arrangement for synchronizing the operation of telegraph apparatus with received code signals including both message and idle time signals, said arrangement including a correction device, means to produce unidirectional current pulses of substantially constant amplitude, one of said pulses being produced for each transition between marking and spacing elements of said code signals, an overspeed charging circuit, an underspeed charging circuit, a commutator synchronized with said correction device and connected in circuit between said charging circuits and said pulse producing means to vary the amplitude of said pulses in accordance with the degree of asynchronism between said code signals and said commutator to produce correction pulses, said commutator being arranged to apply said correction pulses to said overspeed charging circuit when said commutator is being driven at a speed higher than the production of said received code signals and to apply said correction pulses to said underspeed charging circuits when said commutator is being driven at a speed lower than the production of said received code signals, each of said charging circuits including a parallel connected resistor and condenser providing a time constant at which a single one of said pulses will only partially charge said condenser whereby said charging circuits are affected in proportion to the amplitude of said correction pulses and independently of the repetition rate thereof, means to integrate the output of said condenser impedance device circuits, and means to utilize said integrated output to control said correction device.

10. A method of synchronizing the operation of telegraph apparatus with received code signals including both message and idle time signals, said method including the steps of producing unidirectional current pulses of substantially constant amplitude for each transition between marking and spacing elements of said received code signals, varying the amplitude of said pulses in accordance with the degree of asynchronism between said code signals and said telegraph apparatus to produce correction pulses, storing said correction pulses in direct proportion to the amplitude of said correction pulses and independently of the repetition rate thereof, integrating said stored pulses, and utilizing said integrated stored pulses to control said telegraph apparatus.

11. A method of synchronizing the operation of telegraph apparatus with received code signals including both message and idle time signals, said method including the step of producing unidirectional current pulses of substantially constant amplitude for each transition between marking and spacing elements of said received code signals, determining the phase relationship between said pulses and said telegraph apparatus, varying the amplitude of said pulses in accordance with said phase relationship to produce correction pulses, storing said correction pulses in direct proportion to the amplitude of said correction pulses and independently of the repetition rate thereof, integrating said stored pulses, and utilizing said integrated stored pulses to correct the phase of said telegraph apparatus.

12. A method of synchronizing the operation of telegraph apparatus with received code signals including both message and idle time signals, said telegraph apparatus incorporating a correction device, said method including the step of producing unidirectional current pulses of substantially constant amplitude for each transition between marking and spacing elements of said received code signals, determining the phase relationship between said correction device and said received signals, varying the amplitude of said pulses in accordance with the phase relationship between said code signals and said correction device to produce correction pulses, storing said correction pulses in direct proportion to the amplitude of said correction pulses and independently of the repetition rate thereof, integrating said stored pulses, and utilizing said integrated stored pulses to correct the phasing of said correction device.

13. An arrangement for synchronizing the operation of telegraph apparatus with received code signals including both message and idle time signals, said arrangement including means to produce unidirectional current pulses of substantially constant amplitude, one of said pulses being produced for each transition between marking and spacing elements of said code signals, a commutator having a contactor to which said pulses are applied and two sets of contacts symmetrically arranged with respect to each other to make contact with said contactor to receive said pulses therefrom, an overspeed charging circuit connected to one of said sets of contacts, an underspeed charging circuit connected to the other of said sets of contacts, means associated with each of said sets of contacts to vary the amplitude of said pulses in accordance with the degree of asynchronism between said code signals and said commutator to produce correction pulses, said commutator being arranged to apply said correction pulses to said overspeed charging circuit when said commutator is being driven at a speed higher than the production of said received code signals and to apply said correction pulses to said underspeed charging circuits when said commutator is being driven at a speed lower than the production of said received code signals, said charging circuits being affected in proportion to the amplitude of said correction pulses and independently of the repetition rate thereof, means to integrate the output of said charging circuit, and means to utilize said integrated output to control said telegraph apparatus.

14. An arrangement for synchronizing the operation of telegraph apparatus with received code signals including both message and idle time signals, said arrangement including a correction device, means to produce unidirectional current pulses of substantially constant amplitude, one of said pulses being produced for each transition between marking and spacing elements of said code signals, a commutator synchronized with said correction device, said commutator having a contactor to which said pulses are applied and two sets of contacts symmetrically arranged with respect to each other to receive said pulses upon contact with said contactor, resistors bridged between the individual contacts of each of said sets of contacts, an overspeed charging circuit connected to one of said sets of contacts and an underspeed charging circuit connected to the other of said sets of contacts to vary the amplitude of said pulses in accordance with the degree of asynchronism between said code signals and said commutator to produce correction pulses, means to apply said correction pulses to said charging circuits to affect the same in direct proportion to the amplitude of said correction pulses and independently of the repetition rate thereof, means to integrate the output of said charging circuits, and means to utilize said integrated output to control said correction device.

15. An arrangement for synchronizing the operation of telegraph apparatus with received code signals including both message and idle time signals, said arrangement including means to produce unidirectional current pulses of substantially constant amplitude, one of said pulses being produced for each transition between marking and spacing elements of said code signals, a correction device including a commutator having a contactor arranged to make contact with at least one contact of two sets of contacts symmetrically arranged with respect to said contactor and resistors bridging the individual contacts of each set of contacts, an overspeed charging circuit connected to a contact of one of said sets of contacts and an underspeed charging circuit connected to a contact of the other of said sets of contacts to vary the amplitude of said pulses in accordance with the degree of asynchronism between said code signals and said commutator to produce correction pulses and to apply said correction pulses to said charging circuits to affect the same in direct proportion to the amplitude of said correction pulses and independently of the repetition rate thereof, means to integrate the output of said charging circuits, and means to utilize said integrated output to control said correction device.

ARTHUR E. CANFORA.
LEWIS A. THOMAS.

REFERENCES CITED

The following references are of record in the file of this patent:

UNITED STATES PATENTS

| Number | Name | Date |
|---|---|---|
| 2,062,009 | Mathes | Nov. 24, 1936 |
| 2,150,239 | Nichols | Mar. 14, 1939 |
| 2,212,447 | Mathes | Aug. 20, 1940 |
| 2,230,435 | Potts | Feb. 4, 1941 |
| 2,258,152 | Sheuk | Oct. 7, 1941 |
| 2,309,622 | Anderson | Feb. 2, 1943 |
| 2,329,077 | Nichols | Sept. 7, 1943 |
| 2,369,625 | Wegener | Feb. 13, 1945 |
| 2,383,360 | Artzt | Aug. 21, 1945 |